US011188818B2

(12) United States Patent
Nakano et al.

(10) Patent No.: US 11,188,818 B2
(45) Date of Patent: *Nov. 30, 2021

(54) RESERVOIR COMPUTING SYSTEM

(71) Applicant: INTERNATIONAL BUSINESS MACHINES CORPORATION, Armonk, NY (US)

(72) Inventors: Daiju Nakano, Kanagawa-ken (JP); Seiji Takeda, Tokyo (JP); Toshiyuki Yamane, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 741 days.

This patent is subject to a terminal disclaimer.

(21) Appl. No.: 15/477,677

(22) Filed: Apr. 3, 2017

(65) Prior Publication Data

US 2018/0285728 A1    Oct. 4, 2018

(51) Int. Cl.
| | |
|---|---|
| *G06N 3/067* | (2006.01) |
| *G06N 3/08* | (2006.01) |
| *G06N 3/04* | (2006.01) |
| *G06N 3/063* | (2006.01) |

(52) U.S. Cl.
CPC ............ *G06N 3/0675* (2013.01); *G06N 3/04* (2013.01); *G06N 3/049* (2013.01); *G06N 3/0445* (2013.01); *G06N 3/0454* (2013.01); *G06N 3/0472* (2013.01); *G06N 3/0635* (2013.01); *G06N 3/082* (2013.01); *G06N 3/088* (2013.01)

(58) Field of Classification Search
CPC ...... G06N 3/0675; G06N 3/04; G06N 3/0445; G06N 3/049; G06N 3/0635; G06N 3/082; G06N 3/088
See application file for complete search history.

(56) References Cited

U.S. PATENT DOCUMENTS

| | | | | |
|---|---|---|---|---|
| 9,165,246 | B2 * | 10/2015 | Pickett | G06N 3/04 |
| 9,477,136 | B2 * | 10/2016 | Bienstman | G06N 3/0675 |
| 10,153,806 | B1 * | 12/2018 | Petre | G06K 9/0051 |

FOREIGN PATENT DOCUMENTS

EP    2 821 942 A2    7/2015

OTHER PUBLICATIONS

Jalalvand, "Connected Digit Recognition by Means of Reservoir Computing", pp. 1725-1728, 2011 (Year: 2011).*

(Continued)

*Primary Examiner* — Ann J Lo
*Assistant Examiner* — Van C Mang
(74) *Attorney, Agent, or Firm* — Tutunjian & Bitetto. P.C.; Randall Bluestone (57) ABSTRACT

To realize a reservoir computing system easily implemented as hardware, provided is a reservoir computing system including a reservoir operable to output an inherent output signal in response to an input signal. An input node is operable to supply the reservoir with an input signal corresponding to input data, and an output node is operable to output an output value corresponding to an output signal that is output by the reservoir in response to the input data. An adaptive filter is operable to output output data based on a result obtained by weighting a plurality of the output values output from the output node at a plurality of timings with a plurality of weights. Also provided are a learning method and a computer program product.

18 Claims, 8 Drawing Sheets

(56) References Cited

OTHER PUBLICATIONS

Lukosevicius, (Reservoir computing approaches to recurrent neural network training), pp. 127-149, 2009 (Year: 2009).*
Georg Holzmann, "Echo State Networks with Filter Neurons and a Delay&Sum Readout", pp. 2-29, 2008 (Year: 2008).*
Petrenas, "An Echo State Neural Network for QRST Cancellation During Atrial Fibrillation", IEEE, p. 2950-2957 (Year: 2012).*
Yu, "A brain-inspired spiking neural network model with temporal encoding and learning", pp. 1-13 (Year: 2014).*
Verstraeten, "Reservoir Computing with Stochastic Bitstream Neurons", pp. 454-459, 2005 (Year: 2005).*
Gurel, "Functional identification of biological neural networks using reservoir adaptation for point processes", pp. 279-299, 2009 (Year: 2009).*
Bernard Widrow, "Neural Nets for Adaptive Filtering and Adaptive Pattern Recognition", IEEE, pp. 25-39 (Year: 1988).*
Yoshitaka Itoh, "Chaotic Time Series Prediction by Combining Echo-State Networks and Radial Basis Function Networks", IEEE, pp. 238-243 (Year: 2010).*
Andy Field, "Discovering Statistics Using Sps", Third Edition, 2009 (Year: 2013).*
Mantas Lukosevicius, "Reservoir computing approaches to recurrent neural network training", 2009 (Year: 2009).*
Paugam-Moisy, H. et al., "Delay learning and polychronization for reservoir computing" Neurocomputing (Feb. 2008) pp. 1143-1158, vol. 71.
Appeltant, L. et al., "Constructing optimized binary masks for reservoir computing with delay systems" Scientific Reports (Jan. 2014) pp. 1-5, vol. 4, No. 3629.
Dimarco, C.A., "Reservoir Computing Dynamics for Single Nonlinear Node with Delay Line Structure" Mathematics—Dynamical Systems (Oct. 2015) pp. 1-12.
Appeltant, L., "Reservoir Computing Based on Delay-Dynamical Systems" Thesis from VRIJE Universiteit Burssel (May 2012) pp. 1-160.

* cited by examiner

RESERVOIR COMPUTING SYSTEM

BACKGROUND

Technical Field

The present invention relates to a reservoir computing system.

Related Art

As a learning method that handles time-series data such as for voice recognition and stock prediction, a reservoir computing system is known that uses a recurrent type network structure known as a reservoir.

Such a reservoir computing system learns weights of an output mechanism, without changing the weights of the input mechanism and the weights inside the reservoir after these weights are initially set as random numbers or the like, and therefore it is possible to use this reservoir computing system as a reservoir if it is a physical device that outputs a nonlinear output signal in response to an input signal. However, when a physical device is actually used as a reservoir, it is difficult to extract the output signals from all of the nodes of the internal network in this reservoir. Furthermore, if a connection failure occurs in a portion of the nodes, even if the reservoir is operating normally, it is impossible to perform learning or the like unless this connection failure is resolved.

SUMMARY

According to a first aspect of the present invention, provided is a reservoir computing system comprising a reservoir operable to output an inherent output signal in response to an input signal; an input node operable to supply the reservoir with an input signal corresponding to input data; an output node operable to output an output value corresponding to an output signal that is output by the reservoir in response to the input data; and an adaptive filter operable to output output data based on a result obtained by weighting a plurality of the output values output from the output node at a plurality of timings with a plurality of weights. Also provided are a learning method and a computer program product.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
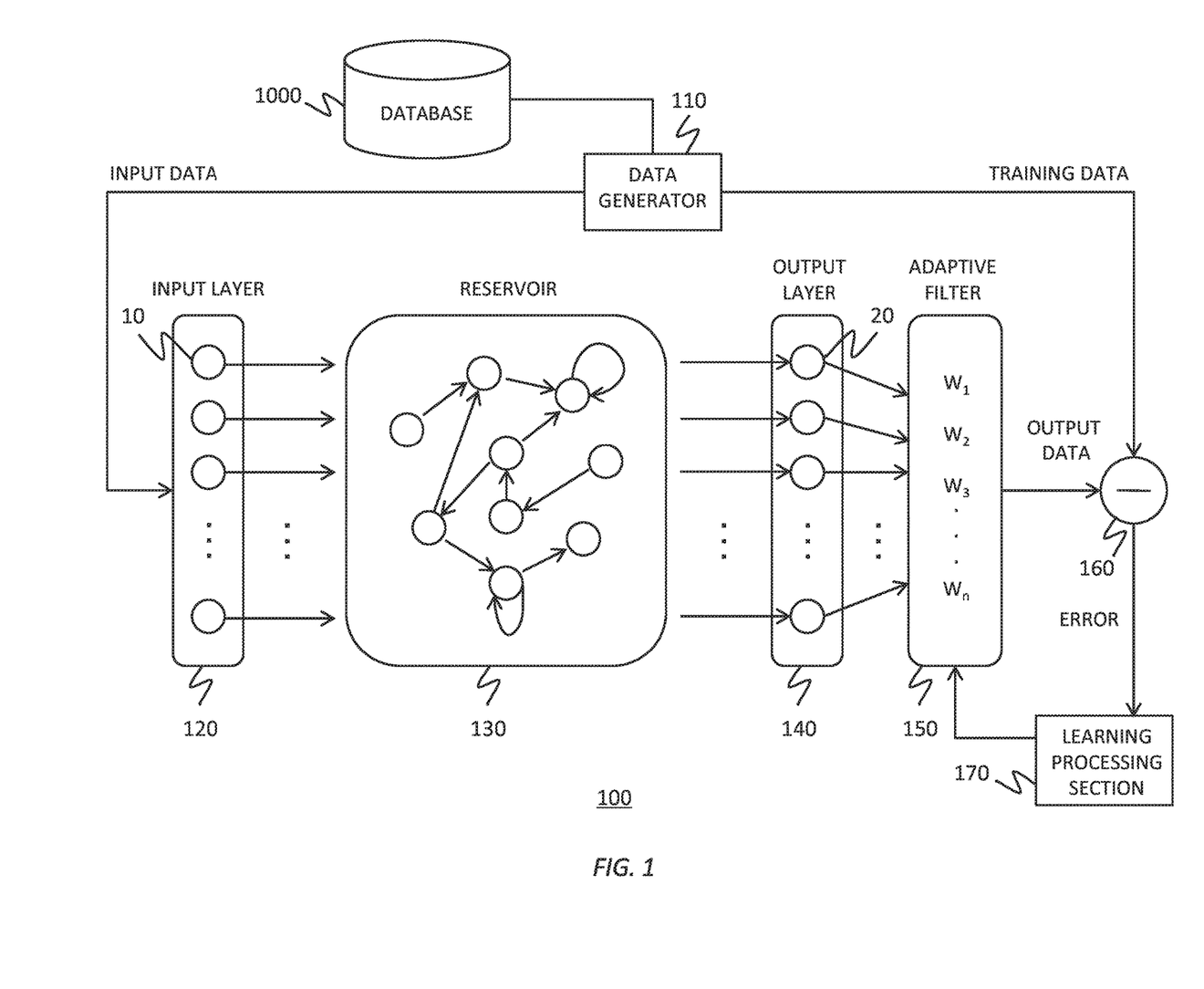
FIG. 1 shows an exemplary configuration of a reservoir computing system 100.

FIG. 1 shows an exemplary configuration of a reservoir computing system 100. The reservoir computing system 100 may be an apparatus that performs learning based on input data, output data, and training data. Furthermore, the reservoir computing system 100 may be operable to perform testing and make predictions for output data corresponding to the input data, based on the learning results. The reservoir computing system 100 adjusts weights in the system, in a manner to reduce the difference between output data that is output in response to the input data and training data corresponding to the input data. The reservoir computing system 100 includes a data generator 110, an input layer 120, a reservoir 130, an output layer 140, an adaptive filter 150, a comparing section 160, and a learning processing section 170.

The data generator 110 may be operable to generate the input data and supply the reservoir computing system 100 with the input data. If the reservoir computing system 100 is performing learning, the data generator 110 may generate training input data and training data corresponding to this input data, and supply the reservoir computing system 100 with this input data and training data. Furthermore, when the reservoir computing system 100 performs a test, makes a prediction, or the like based on learning results, the data generator 110 may generate input data for testing and supply the reservoir computing system 100 with this input data.

The data generator 110 is connected to an external database 1000 or the like, and may be operable to acquire the input data and the training data. Instead, the data generator 110 may generate the input data and the training data, using a predetermined algorithm or the like. The input data is a time-series data sequence in which a plurality of pieces of data are arranged according to the time axis, such as audio data, video data, or the like, for example. Furthermore, the training data may be expected output data that is expected for the input data.

The data generator 110 may read and acquire input data stored in a predetermined format. Furthermore, the data generator 110 may be connected to a network or the like and acquire input data and the like via this network. Instead of or in addition to this, the data generator 110 may be connected to an apparatus manipulated by a user, an apparatus (sensor) that detects and outputs time-series data, or the like, and acquires the time-series input data. The data generator 110 may store the acquired input data and the like in a storage apparatus or the like inside the reservoir computing system 100.

The input layer 120 may be operable to input the input data from the data generator 110. The input layer 120 may include one or more input nodes 10. The input data may be input to one or more corresponding input nodes 10. Each input node 10 may be operable to supply the reservoir 130 with an input signal corresponding to the input data. Each input node 10 may be operable to supply the input signal to one or more corresponding nodes of the reservoir 130. A weight may be set between each input node 10 and one or more corresponding nodes of the reservoir 130. Each input node 10 may supply an input signal that has been multiplied by the weight set for the input data to the one or more corresponding nodes.

The reservoir 130 may be operable to output an inherent output signal in response to the input signal. The reservoir 130 may have a network including a plurality of nodes. The reservoir 130 may have a recurrent type network structure. Each of the plurality of nodes of the reservoir 130 may be a nonlinear node that issues a nonlinear response to the input signal. The plurality of nodes of the reservoir 130 may be virtual nodes. In the network including the reservoir 130, each of the plurality of nodes may supply other corresponding nodes with a response signal corresponding to the input signal. In this case, each of the plurality of nodes may supply the other corresponding nodes with a weighted response signal.

The output layer 140 may be operable to output the response signal output by each node of the reservoir 130. The output layer 140 may include a plurality of output nodes 20. The output layer 140 preferably includes a number of output nodes 20 that is substantially the same as the number of nodes of the reservoir 130. For example, the plurality of output nodes 20 correspond one-to-one with the plurality of nodes of the reservoir 130. Each output node 20 may be operable to output an output value corresponding to the output signal output by the reservoir 130 in response to the input data. Each output node 20 may be operable to output to the adaptive filter 150 an output value of a corresponding node of the reservoir 130.

The adaptive filter 150 may be operable to output the output data based on the output value output from each output node 20. For example, the adaptive filter 150 applies weights corresponding respectively to the output value output by each output node 20, and outputs the result obtained by performing a predetermined calculation as the output data. As an example, the adaptive filter 150 outputs, as the output data, the sum of each of the weighted values of the output values of the output nodes 20. If the number of output nodes 20 is n, for example, the adaptive filter 150 outputs, as the output data, the sum $\Sigma w_n V_n$ of the values obtained by multiplying the n output values $V_n$ by the corresponding n weights ($w_1, w_2, \ldots w_n$). The adaptive filter 150 may be operable to supply the comparing section 160 with the output data.

The comparing section 160 may be operable to compare the expected output data output by the data generator 110 to the output data output by the adaptive filter 150. For example, the comparing section 160 outputs the difference between the expected output data and the output data as an error. The comparing section 160 may supply the learning processing section 170 with this error as the comparison result.

Furthermore, the comparing section 160 may be operable to perform a comparison operation if the reservoir computing system 100 is learning. The comparing section 160 may be operable to, if the reservoir computing system 100 is performing a test or making a prediction using learning results, output the output data of the adaptive filter 150 to the outside as-is. In this case, the comparing section 160 may be operable to output the output data to an external output apparatus such as a display, a storage apparatus, and an external apparatus such as the database 1000.

The learning processing section 170 may be operable to set the plurality of weights of the adaptive filter 150 according to the comparison results of the comparing section 160. The learning processing section 170 may be operable to set the plurality of weights such that the reservoir computing system 100 outputs the output data that is expected in response to the input data. The learning processing section 170 may be operable to update the plurality of weights in a manner to further reduce the error between the output data output by the adaptive filter 150 in response to the training input data being supplied to the input node 10 and the expected output data that is expected for the training input data. The learning processing section 170 may be operable to operate if the reservoir computing system 100 is learning.

The reservoir computing system 100 described above may be a system capable of learning by updating the weights of the adaptive filter 150. Specifically, the reservoir computing system 100 may be operable to perform learning by updating the weights of the adaptive filter 150 while the weights between the input layer 120 and the reservoir 130 and the weights within the reservoir 130 are fixed at randomly determined initial values, for example.

Furthermore, by fixing the weights of the adaptive filter 150 at the learned weights and inputting input data for testing, the reservoir computing system 100 can output test results or prediction results for the input data for testing. Such a reservoir computing system 100 can simulate a learning operation and a testing operation by performing matrix calculations. Furthermore, if the reservoir computing system 100 is a physical device that outputs a nonlinear output signal in response to an input signal, the reservoir computing system 100 can be used as a reservoir 130, and is therefore expected to be a system with easy hardware installation.

However, if such a reservoir computing system 100 is implemented as a physical system, the output signals need to be extracted from the plurality of nodes of the reservoir 130. However, it is difficult to extract the output signals from all of the nodes of the internal network of the reservoir 130. Furthermore, if the reservoir 130 uses virtual nodes, it is difficult to extract the output signals from the virtual nodes. Further, if a failure occurs in the attempt to extract the output signals from a portion of the nodes of the reservoir 130, even if the reservoir 130 operates correctly, it is very difficult to accurately perform the learning, testing, and the like if this failure is not resolved.

Therefore, the reservoir computing system according to the present embodiments performs the learning, predicting, and the like based on the output signals of a portion of the nodes of the reservoir 130. The following describes such a reservoir computing system.

Figure 2:
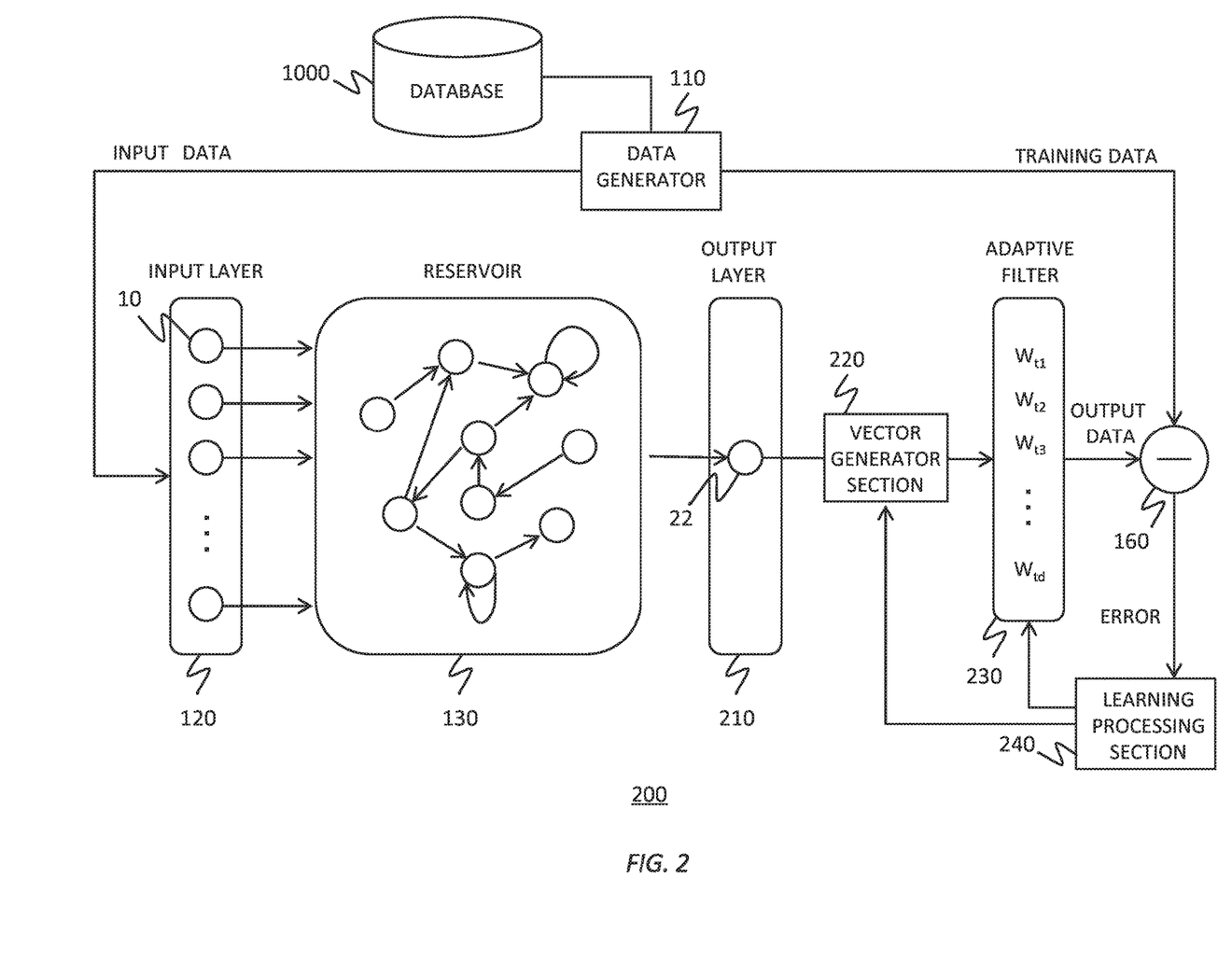
FIG. 2 shows an exemplary configuration of a reservoir computing system 200 according to the present embodiment.

FIG. 2 shows an exemplary configuration of a reservoir computing system 200 according to the present embodiment. In the reservoir computing system 200 according to the present embodiment, components having substantially the same operation as components of the reservoir computing system 100 shown in FIG. 1 are given the same reference numerals and descriptions thereof are omitted. The reservoir computing system 200 according to the present embodiment includes the data generator 110, the input layer 120, the reservoir 130, an output layer 210, a vector generator section 220, an adaptive filter 230, and a learning processing section 240.

The output layer 210 may be operable to output response signals that are output by a portion of the plurality of nodes of the reservoir 130. The output layer 210 may include one or more output nodes 22. The output layer 210 may include a number of output nodes 22 that is less than the number of nodes of the reservoir 130. In other words, only some of the nodes among the plurality of nodes of the reservoir 130 are connected to output nodes 22.

FIG. 2 shows an example in which the output layer 210 includes one output node 22, and only one node among the plurality of nodes of the reservoir 130 is connected to the output node 22. The output node 22 may be operable to output an output value corresponding to an output signal output by the reservoir 130 in response to the input data. The output node 22 may be operable to output the output value of the corresponding node of the reservoir 130 to the vector generator section 220.

The vector generator section 220 may be operable to generate a multidimensional vector based on the output value output from the one output node 22 and a plurality of timings. The vector generator section 220 may be operable to generate a d-dimensional delay coordinate vector based on one-dimensional time-series data and d timings. In this case, the vector generator section 220 may generate d data sequences.

Here, if the time-series data is a continuous value, the time difference between temporally adjacent timings among the plurality of timings is an interval T. Specifically, if the time-series data is a continuous value, the vector generator section 220 may generate the d-dimensional delay coordinate vector with d timings at intervals T. If the time-series data is a digital value, the vector generator section 220 may generate the d-dimensional delay coordinate vector with d timings corresponding to the clock period.

If n is the degree of freedom of the reservoir 130, i.e., the number of nodes in the reservoir 130, the vector generator section 220 may generate a d-dimensional delay coordinate vector in which d is greater than n. In this case, the vector generator section 220 preferably generates a d-dimensional delay coordinate vector in which d is greater than 2n. If the output layer 210 includes a plurality of output nodes 22, the vector generator section 220 may generate a delay coordinate vector for each output node 22. The vector generator section 220 supplies the adaptive filter 230 with the generated delay coordinate vectors.

The adaptive filter 230 may be operable to output output data based on results obtained by weighting a plurality of output values output from the output node 22 at a plurality of timings with a plurality of weights. The adaptive filter 230 may use a plurality of weights corresponding to the dimensions d of the delay coordinate vector. For example, for each of the d data sequences, the adaptive filter 230 may weight this data sequence using d weights.

The adaptive filter 230 may generate and output the output data from the weighted d-dimensional delay coordinate vector. The adaptive filter 230 may be operable to supply the comparing section 160 with the output data. If the reservoir computing system 200 is learning, the comparing section 160 may supply the learning processing section 240 with the difference between the expected output data and the output data as the error. Furthermore, the comparing section 160 may be operable to, if the reservoir computing system 100 is performing a test or making a prediction using the learning results, output the output data of the adaptive filter 150 to the outside as-is.

The learning processing section 240 may be operable to set the plurality of weights of the adaptive filter 150 according to the comparison results of the comparing section 160. The learning processing section 240 may be operable to set the plurality of weights such that the output data expected for the input data is output by the reservoir computing system 200. The learning processing section 240 may be operable to update the plurality of weights in a manner to reduce the error between the output data output by the adaptive filter 230 in response to the training input data being supplied to the input nodes 10 and the expected output data that is expected for the training input data. The learning processing section 240 may be operable to operate if the reservoir computing system 100 is performing learning.

Furthermore, the learning processing section 240 may be operable to adjust at least a portion of the parameters for generation of the delay coordinate vector by the adaptive filter 230. The learning processing section 240 may be operable to, if the time-series data is a continuous value, adjust one or both of the number of dimensions d and the interval T. Furthermore, the learning processing section 240 may be operable to, if the time-series data is a digital value, adjust the number of dimensions d.

In the manner described above, the reservoir computing system 200 may be a system capable of learning based on the output values and the expected output data of a portion of the nodes among the plurality of nodes of the reservoir 130. The following describes the operation of such a reservoir computing system 200.

Figure 3:
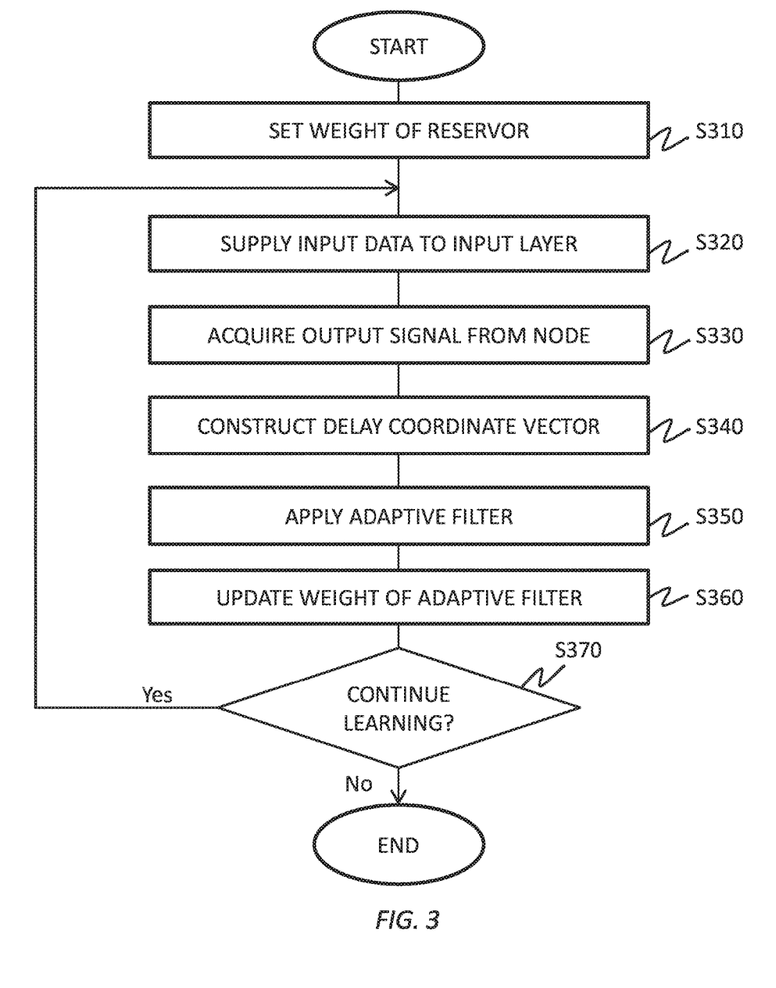
FIG. 3 shows an exemplary operational flow of the reservoir computing system 200 according to the present embodiment.

FIG. 3 shows an exemplary operational flow of the reservoir computing system 200 according to the present embodiment. In the present embodiment, the reservoir computing system 200 may be operable to perform learning by performing the processes from S310 to S370.

First, at S310, the weights of the reservoir 130 may be initially set. The reservoir computing system 200 may perform initial setting of the weights between the input layer 120 and the reservoir 130 and of the weights inside the reservoir 130. The weights between the input layer 120 and the reservoir 130 and of the weights inside the reservoir 130 may be determined using random numbers. The weights between the input layer 120 and the reservoir 130 and the weights inside the reservoir 130 do not need to change according to learning performed after being determined once.

Next, at S320, the input data may be supplied to the input layer 120. The data generator 110 may supply the input layer 120 with the training input data generated by the data generator 110. Here, the data generator 110 may generate the expected output data corresponding to the training input data supplied to the input layer 120 and supply this expected output data to the comparing section 160.

Next, at S330, the output layer 210 may acquire the output signals output by a portion of the nodes of the reservoir 130. In the present embodiment, an example is described in which the output layer 210 includes one output node 22 and acquires the output signal of one node among the plurality of nodes of the reservoir 130.

Next, at S340 the vector generator section 220 may generate the d-dimensional delay coordinate vector. Here, if the time-series data is a continuous value, the vector generator section 220 may generate the delay coordinate vector using d timings and the parameter of the interval T between the timings, as shown in the following expression. Here, x(t) is one-dimensional time-series data output from the one output node 22.

$$x(t), t \in \mathbb{R} \rightarrow \{x(t), x(t-T), \ldots, x(t-(d-1)T)\} \in \mathbb{R}^d \quad \text{Expression 1:}$$

Furthermore, if the time-series data is a digital value, the vector generator section 220 may generate the delay coordinate vector using d timings, as shown in the following expression.

$$x(n), n \in \mathbb{N} \to \{x(n), x(n-1), \ldots, x(n-(d-1))\} \in \mathbb{R}^d \quad \text{Expression 2:}$$

Next, at S350, the adaptive filter 230 may generate and output the output data by applying the weights to the delay coordinate vector. For example, the adaptive filter 230 may multiply the d data sequences respectively by d corresponding weights ($w_{t1}, w_{t2}, \ldots, w_{td}$). Furthermore, the adaptive filter 230 may output, as the output data, the weighted delay coordinate vector configured as one-dimensional time-series data. Specifically, the adaptive filter 230 may calculate the dot product of the delay coordinate vector and a weight vector ($w_{t1}, w_{t2}, \ldots, w_{td}$) having d weights as elements.

Next, at S360, the learning processing section 240 may update the weights of the adaptive filter 230. The learning processing section 240 may update the d weights in a manner to reduce the error between the expected output data and the output data. The learning processing section 240 may update the weights of the adaptive filter 230 such that the output data becomes closer to the expected output data, using, e.g., the least squares method. In this case, the learning processing section 240 may update the d weights using a linear filter.

Furthermore, the learning processing section 240 may update the weights of the adaptive filter 230 in a manner to minimize the square error. In this case, the learning processing section 240 may update the d weights using a Wiener filter.

If the learning is to continue (S370: Yes), the reservoir computing system 200 may return to step S320 and perform the next learning using the next training input data and expected output data. The reservoir computing system 200 may repeat the update of the weights of the adaptive filter 230 a predetermined number of times to determine these weights. If the difference in the value before the weight update and after the weight update is greater than or equal to a predetermined threshold value even after the update of the weights of the adaptive filter 230 has been performed the predetermined number of times, the learning processing section 240 may stop the learning and notify the user that the weights do not converge.

If the learning is to end (S370: No), the reservoir computing system 200 may determine the weights of the adaptive filter 230 to be the most recently updated weights. The reservoir computing system 200 may store the determined weights in an internal storage section and/or an external database 1000 or the like. In the manner described above, the reservoir computing system 200 may complete the learning operation.

By applying the determined weights to the adaptive filter 230 and inputting testing input data, the reservoir computing system 200 can output test results or prediction results for this testing input data. The following describes the input data and the delay coordinate vector of such a reservoir computing system 200.

Figure 4:
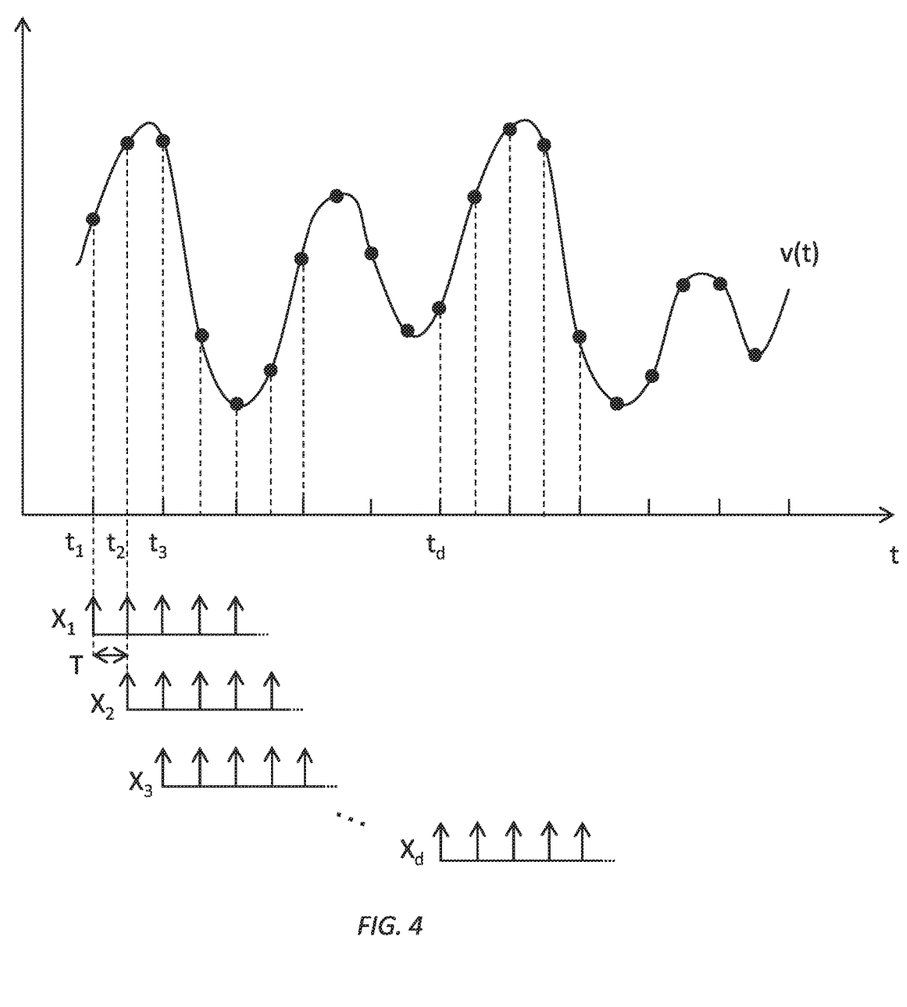
FIG. 4 shows an exemplary delay coordinate vector generated by the vector generator section 220 according to the present embodiment.

FIG. 4 shows an exemplary delay coordinate vector generated by the vector generator section 220 according to the present embodiment. FIG. 4 shows an example in a case where the input data is a continuous value. In FIG. 4, the horizontal axis indicates time t and the vertical axis indicates the signal strength V. The curve v(t) shows an example of the input data.

The vector generator section 220 may set a data sequence $X_1$ having a signal strength $v(t_m)$ at the time $t_m$ at every interval T from the signal strength $v(t_1)$ at the timing $t_1$ as the first vector element of the delay coordinate vector. Furthermore, the vector generator section 220 may set a data sequence $X_2$ having a signal strength $v(t_m)$ at the time $t_m$ at every interval T from the signal strength $v(t_2)$ at the timing $t_2$ as the second vector element of the delay coordinate vector. In the same manner, the vector generator section 220 may extract data sequences up to the data sequence $X_d$ of the d vector elements and set these data sequences from the data sequence $X_1$ to the data sequence $X_d$ as the delay coordinate vector.

In this case, the adaptive filter 230 may calculate the data sequence $w_{t1}X_1$ by multiplying each piece of data in the data sequence $X_1$ by the weight $w_{t1}$. In the same manner, the adaptive filter 230 may calculate the data sequences $w_{t1}X_1$, $w_{t2}X_2, \ldots, w_{t3}X_3$ by multiplying each piece of data in each of the data sequences from the data sequence $X_2$ to the data sequence $X_d$ by the corresponding weights from $w_{t2}$ to $w_{td}$.

The adaptive filter 230 may then calculate the data sequence $w_{t1}X_1$ at the timing $t_1$ and calculate the data sequence $w_{t2}X_2$ at the timing $t_2$. Here, among the pieces of data of the data sequence $w_{t1}X_1$ and the data sequence $w_{t2}X_2$, pieces of data with the same timings may be added together. In the same manner, the adaptive filter 230 may calculate each data sequence from the data sequence $w_{t3}X_3$ to the data sequence $w_{td}X_d$ corresponding to the timings from the timing $t_3$ to the timing $t_d$, and output the generated time-series data as the output data.

FIG. 4 shows an example in which the input data is a continuous value, but instead the input data may be a digital signal expressed by a signal strength $v(t_1+(m-1)T_c)$ with a constant clock period $T_c$. In this case, in the same manner as in the example where the input data is a continuous value, the vector generator section 220 may set the data sequence $X_1$ from the signal strength $v(t_1)$ at the timing $t_1$ as the first vector element of the delay coordinate vector. Furthermore, the vector generator section 220 may set the data sequence $X_2$ from the timing $t_2=t_1+T_c$ as the second vector element of the delay coordinate vector.

In the same manner, the vector generator section 220 may extract the data sequences up to the data sequence $X_d$ of the d-th vector element and set the data sequences from the data sequence $X_1$ to the data sequence $X_d$ as the delay coordinate vector. In this case, the interval T may be substantially equal to the clock period $T_c$. In this way, regardless of whether the input data is a continuous value or a digital value, the adaptive filter 230 can output the output data using the same operation.

An "Embedding Theorem" according to Takens is known as a technique for investigating a dynamics model, if the structure of the dynamics model is unknown, by performing a reconfiguration using the time delay coordinates corresponding to the time-series data that has actually been measured. The reservoir computing system 200 uses such an embedding theorem, and therefore can perform the learning and testing operations corresponding to the state of the reservoir 130 without using the output values of all of the nodes of the reservoir 130. This improves the overall performance of the system.

Figure 5:
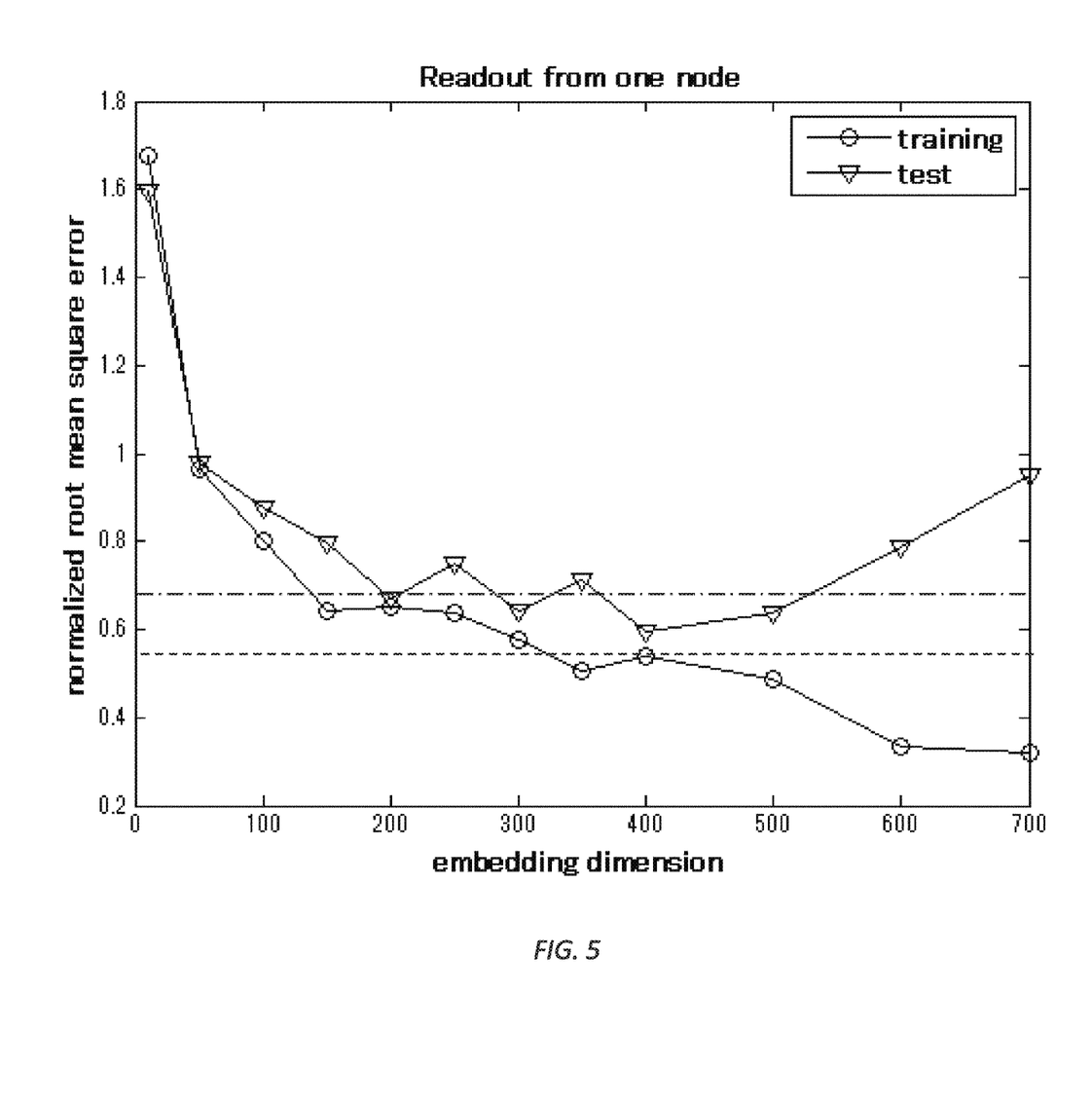
FIG. 5 shows exemplary learning results of the reservoir computing system 200 according to the present embodiment described above.

FIG. 5 shows exemplary learning results of the reservoir computing system 200 according to the present embodiment described above. FIG. 5 shows the steps by which the reservoir computing system 200 further adjusts the parameter d used by the vector generator section 220. In FIG. 5, the horizontal axis indicates the dimensions d of the delay coordinate vector. In FIG. 5, the vertical axis indicates the evaluation value of the error. The evaluation value of the error is the normalized root mean square error, and is abbreviated as NRMSE. The NRMSE is expressed as shown in the following expression.

$$NRMSE = \sqrt{\frac{\langle (y-y')^2 \rangle}{\langle (y-\langle y \rangle)^2 \rangle}} \quad \text{Expression 3}$$

In Expression 3, the expected output data, which is the training data, is y, and the output data is y'. Specifically, the denominator in Expression 3 indicates the standard deviation of the expected output data y, and the numerator indicates the expected value of the square of the error y-y'. The evaluation value NRMSE indicates that the learning is effective if the value is smaller than 1 and indicates that the effect of the learning is higher when this value is closer to 0. Specifically, the evaluation value NRMSE is an evaluation value that approaches 0 as the error y-y' becomes smaller.

FIG. 5 shows an example of results obtained by the reservoir computing system 200 learning an Echo Stat Network as shown by the following expression.

$$x(n+1) = \tanh(W_{res}x(n) + W_{in}u(n)) \quad \text{Expression 4}$$

$$y'(n) = W\_outx(n)$$

$$y(n) = 0.3y(n-1) +$$

$$0.05y(n-1)\sum_{i=1}^{10} y(n-i) + 1.5u(n-1)u(n-10) + 0.1$$

Here, u(n) represents the input data input to the input node 10, x(n) represents reservoir state vector corresponding to the input data, and y'(n) represents the output data. Furthermore, $W_{in}$ represents the coupled matrix between the input node 10 and the reservoir 130, $W_{res}$ represents the coupled matrix inside the reservoir 130, and $W_{out}$ represents the coupled matrix between the reservoir 130 and the output node 22. Yet further, $W_{res}$ may be a sparse matrix with a connectivity of approximately 0.3, for example.

In addition, y(n) represents the expected output data. The expected output data y(n) in Expression 4 is a model that is known as a NARMA (10) model used as a benchmark in reservoir computing. Here, NARMA is an abbreviation for Nonlinear Auto Recursive Moving Average.

FIG. 5 shows an example of results obtained by the reservoir computing system 200 learning the NARMA (10) model for every dimension d of the delay coordinate vector using the reservoir 130 including 100 nodes therein. The circle marks plotted in FIG. 5 indicate learning results of the reservoir computing system 200. Furthermore, the triangular marks plotted in FIG. 5 indicate results of a test using the learning results.

FIG. 5 uses a dotted line to show the learning results of the reservoir computing system 100 using the output data from all of the output nodes 20, as described in FIG. 1, for comparison. The single-dash line indicates the test results obtained using the learning results of the reservoir computing system 100. Since the reservoir computing system 100 using all of the output nodes 20 does not use a delay coordinate vector, the learning results and test results are substantially constant values that are unrelated to the value d of the horizontal axis.

From FIG. 5, it is understood that if the number of dimensions is less than or equal to 100, which is the number of nodes in the reservoir 130, the performance enters "underfitting" territory where the reservoir computing system 200 does not have an effect despite performing the learning. It is also understood that if the number of dimensions d of the delay coordinate vector exceeds approximately twice the number of nodes (100) of the reservoir 130, the reservoir computing system 200 can perform learning with high accuracy. Yet further, it is understood that if the number of dimensions d of the delay coordinate vector exceeds approximately 500, the reservoir computing system 200 enters into "over-fitting" territory.

Accordingly, the learning processing section 240 may be operable to adjust the number of timings among the plurality of timings, i.e., the number of dimensions d, in a manner to further decrease the error. The learning processing section 240 may be operable to compare the learning results corresponding to the plurality of dimensions d and set a suitable number of dimensions d, as shown in the example of FIG. 5. Furthermore, the learning processing section 240 may be operable to also adjust the interval T between the plurality of timings. The learning processing section 240 may be operable to compare the learning results for a plurality of intervals T and set a suitable interval T, as shown in the example of FIG. 5. The learning processing section 240 may be operable to adjust at least one of the number of dimensions d and the interval T.

The learning processing section 240 may be operable to adjust at least one of the number of timings among the plurality of timings and the interval T between the plurality of timings, using cross-validation. Specifically, the learning processing section 240 may perform learning using a portion of a plurality of groups of input data and expected output data corresponding to this input data. The learning processing section 240 may perform testing of the remaining groups using the learning results, and calculate the evaluation value NRMSE according to the error between the output data and the expected output data. FIG. 5 shows an example of evaluation results obtained by the learning processing section 240 using such cross-validation.

In the manner described above, the reservoir computing system 200 according to the present embodiment can perform learning by using the output of a portion of the plurality of nodes of the reservoir 130 to generate a delay coordinate vector from output values at a plurality of timings. If many types of input/output data are to be learned accurately, there is an idea to increase the number of nodes in the reservoir 130 and create a more complex system. In this case, it becomes even more difficult to reliably connect to all of the output nodes and extract the output data.

However, the reservoir computing system 200 according to the present embodiment can restrict the increase in the number of connections to output nodes and perform learning by increasing the number of dimensions d, and can therefore easily adapt to a complex reservoir 130. Furthermore, since learning is possible with just a small amount of an increase in the number of dimensions d of the reservoir computing system 200, e.g., from the total number of nodes to twice the total number of nodes, learning can be performed without significantly increasing the amount of calculations.

Figure 6:
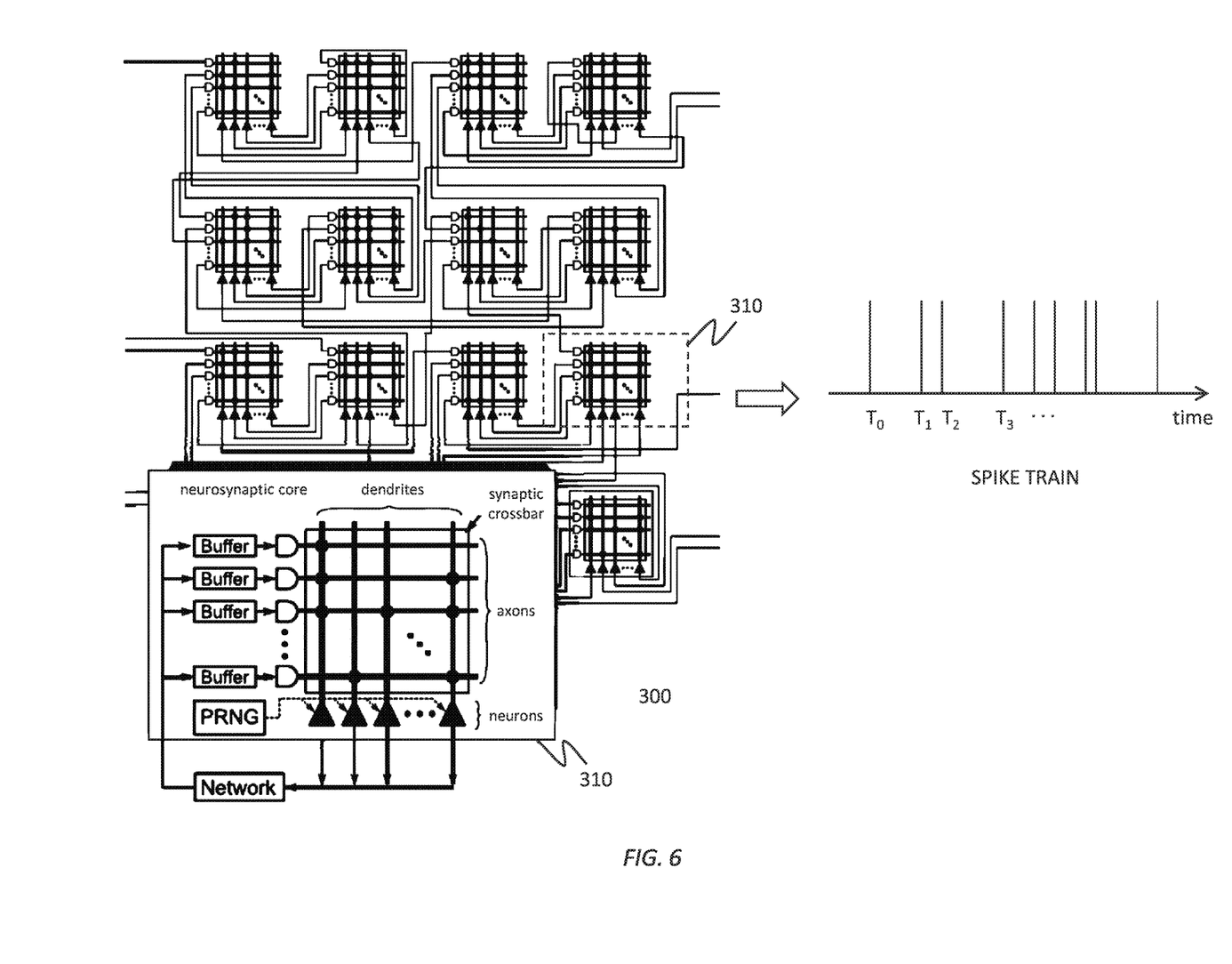
FIG. 6 shows an example of a spike neuron model used by the reservoir computing system 200 according to the present embodiment.

The reservoir computing system 200 according to the present embodiment described above may use a spike neural network or the like as the reservoir 130. FIG. 6 shows an example of a spike neuron model used by the reservoir computing system 200 according to the present embodiment. FIG. 6 shows neuromorphic hardware 300 based on the spike neuron model.

The neuromorphic hardware 300 may include a plurality of neuron devices 310. Each neuron device 310 may be electrically connected to an external signal generating section and one or more other neuron devices 310, and receive an input signal that changes over time. Each neuron device 310 may output a spiked output signal to the one or more other neuron devices 310, according to the input pattern of a plurality of input signals. Such neuromorphic hardware 300 may be configured as a liquid state machine.

The reservoir computing system 200 according to the present embodiment may use such neuromorphic hardware 300 as the reservoir 130. Specifically, the plurality of input nodes 10 in the input layer 120 are each connected to a corresponding neuron device 310. Furthermore, one or more output nodes 22 are connected to a portion of the neuron devices 310 among the plurality of neuron devices 310. For example, one output node 22 receives a spiking train from one neuron device 310, as shown in FIG. 6.

Here, the one output node 22 may be operable to output, as the output value, a value $(T_1-T_0, T_2-T_1, \ldots, T_d-T_{d-1})$ representing the spike interval of the output signal output by the reservoir 130. The output node 22 may supply the vector generator section 220 with such inter-spike intervals. The vector generator section 220 may generate the d-dimensional delay coordinate vector by performing the same operation as used for a digital signal on the inter-spike intervals $(T_1-T_0, T_2-T_1, \ldots, T_d-T_{d-1})$. In this way, the reservoir computing system 200 according to the present embodiment can use a spike neural network or the like as the reservoir 130.

The reservoir computing system 200 described above can perform learning, testing, and the like as long as it is possible to acquire an output signal from a portion of the nodes among the plurality of nodes in the reservoir 130. Accordingly, the reservoir 130 does not need to form all of the nodes as physical nodes. In this case, the reservoir 130 may be a device having a fine structure or the like. The reservoir 130 may be a device forming a spin system, a propagation system for surface acoustic waves, a microwave conducting system, or the like. Furthermore, the reservoir 130 may be a device that includes a ferromagnetic material, a phase change material, or the like.

The reservoir 130 may use an input/output response of such a device. Specifically, the reservoir 130 may be a physical reservoir that outputs an electrical, magnetic, optical, mechanical, thermal, or acoustic output signal in response to an electrical, magnetic, optical, mechanical, thermal, or acoustic input signal. The physical reservoir may include a metal layer, a ferroelectric layer, a ferromagnetic layer, a phase change material layer, and/or the like formed on a substrate.

The physical reservoir may receive an input signal from one or more input sections and propagate the input signal therein. By propagating the input signal therein in a plurality of directions, the physical reservoir may change the signal components in a complex manner and operate as a plurality of virtual nodes. The physical reservoir may output an output signal from an output section according to the input signal being propagated in one or more output sections or according to the effect of the input signal. Even if the reservoir computing system 200 is such a physical reservoir, there is no need to exchange signals with virtual nodes, and therefore the physical reservoir can be used as the reservoir 130 by using signal input sections and output sections along with the signals.

Here, if output signals are received from m output sections of the reservoir 130, for example, m output nodes 22 may respectively receive corresponding output signals. The vector generator section 220 may generate $d_1, d_2, \ldots, d_m$-dimensional delay coordinate vectors for each of the m output signals $x_1(t), x_2(t), \ldots, x_m(t)$, for example, as shown in the following expression. As shown in Expression 5, the reservoir computing system 200 may generate $d_1+d_2+\ldots+d_m$-dimensional delay coordinate vectors.

$$x_1(t) \to \{x_1(t), x_1(t-T), \ldots, x_1(t-(d_1-1)T)\} \quad \text{Expression 5}$$
$$x_2(t) \to \{x_2(t), x_2(t-T), \ldots, x_2(t-(d_2-1)T)\}$$
$$\vdots$$
$$x_m(t) \to \{x_m(t), x_m(t-T), \ldots, x_m(t-(d_m-1)T)\}$$
$$\to \begin{pmatrix} x_1(t), \ldots, x_1(t-(d_1-1)T), x_2(t), \ldots, \\ x_2(t-(d_2-1)T), \ldots, \ldots, x_m(t)(t-(d_m-1)T) \end{pmatrix}$$

Figure 7:
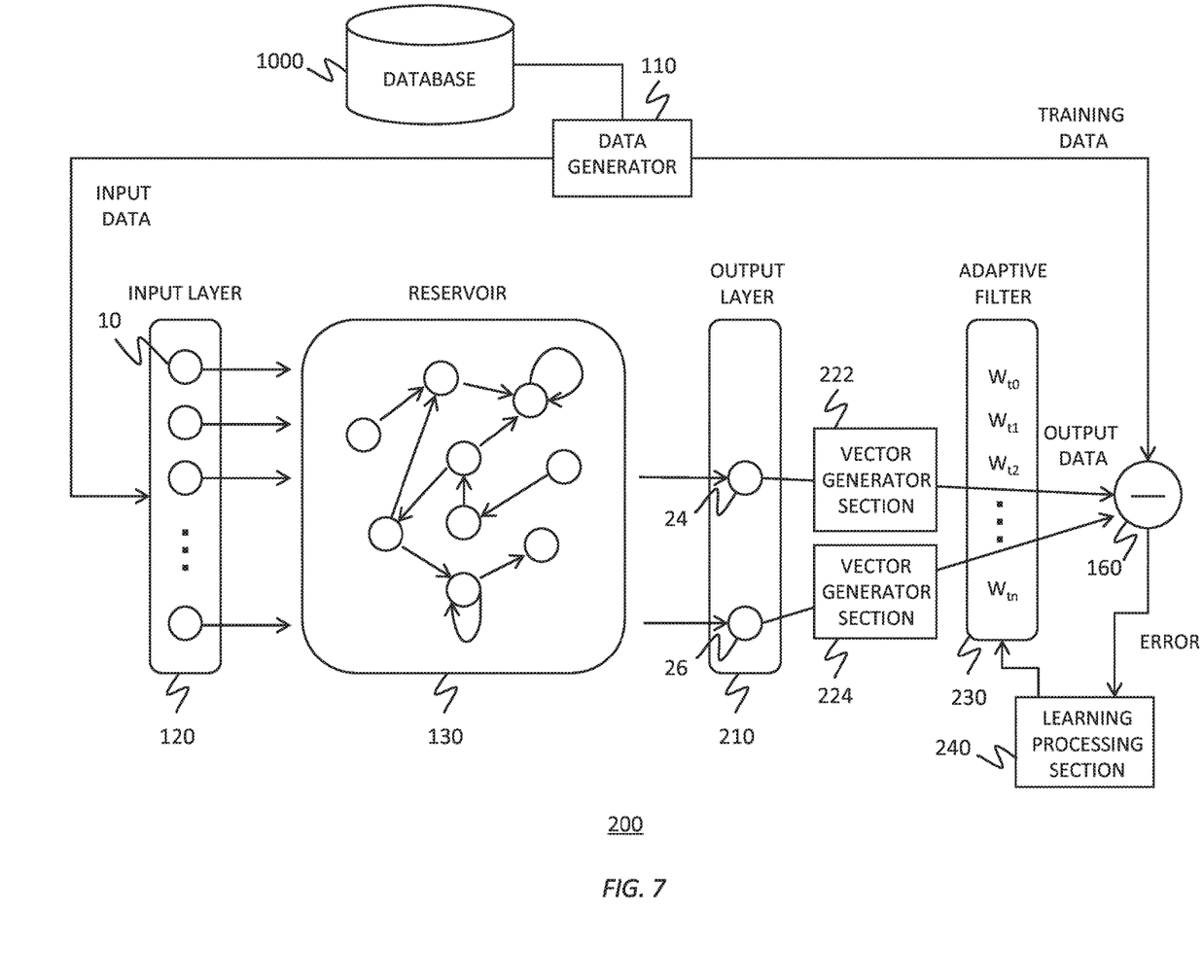
FIG. 7 shows a modification of the reservoir computing system 200 according to the present embodiment.

The reservoir computing system 200 according to the present example described above may include a plurality of output nodes, in order to account for connection failure of the output nodes. Such a reservoir computing system 200 is described using FIG. 7. FIG. 7 shows a modification of the reservoir computing system 200 according to the present embodiment. In the reservoir computing system 200 according to the present modification, components having substantially the same operation as components of the reservoir computing system 200 shown in FIG. 2 are given the same reference numerals and descriptions thereof are omitted.

The reservoir computing system 200 according to the present modification further includes a first output node 24, a second output node 26, a first vector generator section 222, and a second vector generator section 224. The first output node 24 may be connected to a first node among the plurality of nodes of the reservoir 130. The second output node 26 may be connected to a second node among the plurality of nodes of the reservoir 130.

The first vector generator section 222 may be operable to generate the delay coordinate vector, according to the output value from the first output node 24. The second vector generator section 224 may be operable to generate the delay coordinate vector according to the output value from the second output node 26. The adaptive filter 230 may be operable to weight the delay coordinate vector received from the first vector generator section 222 or the second vector generator section 224, and output the result as the output data. In this case, the learning processing section 240 may update different weights for each path as the learning results.

Here, the adaptive filter 230 may be operable to output the output data based on a plurality of output values received by the second output node 26, in response to the path leading to the adaptive filter 230 from the reservoir 130 via the first output node 24 failing. In other words, the reservoir computing system 200 of the present includes a plurality of paths that are each capable of learning independently, and may be operable to perform the learning, testing, or the like using paths that are undamaged among the plurality of paths. In this way, if the reservoir computing system 200 is actually implemented as a hardware device, the reservoir computing system 200 can operate by using other paths when a wiring failure or the like occurs in one of the paths, and can improve the lifespan of the system.

Furthermore, if a plurality of paths are included, the reservoir computing system 200 may be operable to perform the learning, testing, and the like using the plurality of paths. In this case, the output layer 210 may include two or more output nodes connected respectively to two or more nodes among the plurality of nodes of the reservoir 130.

Furthermore, the reservoir computing system 200 may include a plurality of vector generator sections corresponding to the plurality of output nodes. Instead, the reservoir computing system 200 may include one vector generator section, and this one vector generator section may generate a plurality of delay coordinate vectors corresponding respectively to the plurality of output nodes. One or more vector generator sections may generate $d_1, d_2, \ldots, d_m$-dimensional delay coordinate vectors as shown by Expression 5.

The adaptive filter 230 may be operable to output the output data based on results obtained by weighting the plurality of output values output from two or more output nodes at a plurality of timings using a plurality of weights. In this way, by using a plurality of output nodes, it is possible to reduce the number of pieces of time-series data acquired from one output node and to enhance the learning performance. Furthermore, if a failure occurs in one path while performing the learning and testing using a plurality of paths from a plurality of output nodes, the reservoir computing system 200 may continue the learning and testing by using paths excluding this one path.

Figure 8:
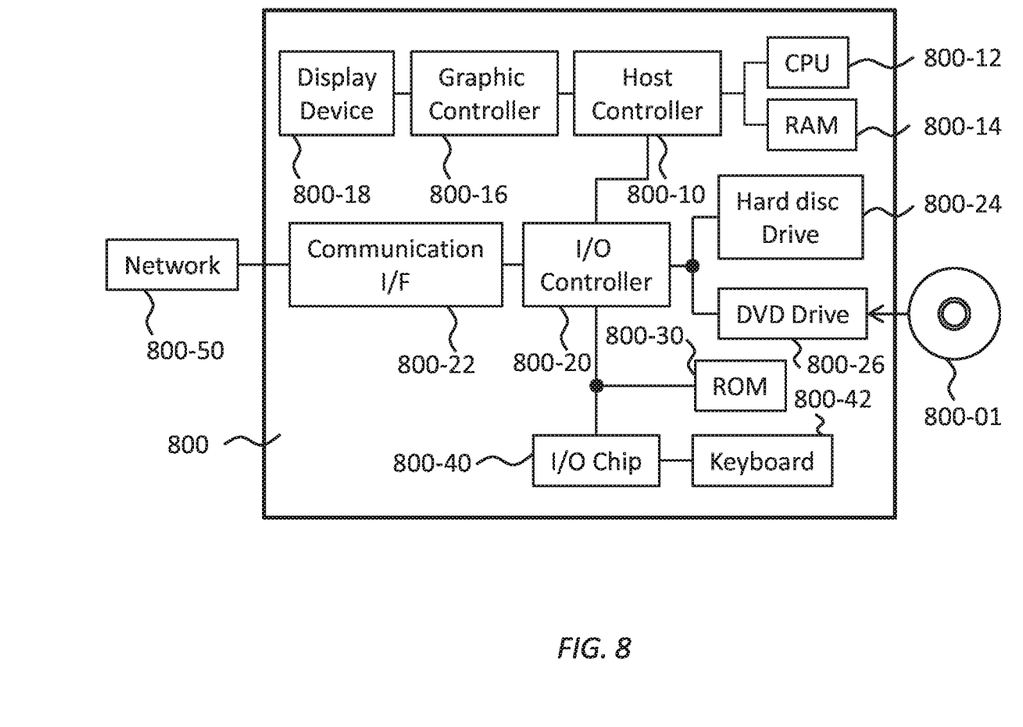
FIG. 8 shows an exemplary hardware configuration of a computer according to the embodiment of the invention.

FIG. 8 shows an exemplary hardware configuration of a computer according to the embodiment of the invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer 800 also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14. In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, according to an embodiment of the present invention, it is possible to perform learning by extracting output signals of a portion of the nodes of a reservoir, and to easily apply this in actual hardware.

What is claimed is:

1. A reservoir computing system, comprising: a hardware processor; a reservoir operable to output an output signal in response to an input signal, the reservoir comprising a plurality of nonlinear nodes; an input node operable to supply the reservoir with an input signal corresponding to input data, the nonlinear nodes being configured to issue a nonlinear response to the input signal; one or more output nodes operable to output an output value corresponding to an output signal that is output by the reservoir in response to the input data, the reservoir being configured to restrict an increase in a number of connections to the output nodes and perform learning by increasing a number of dimensions and adjusting an interval T between a plurality of timings and prevent underfitting of the reservoir computing system; a vector generation section operably connected to the output node, the vector generation section operable to automatically generate a delay coordinate vector using the hardware processor based upon the output value of the output node and the plurality of timings; and an adaptive filter operably connected to the vector generation section, the adaptive filter operable to output output data based on a result obtained by updating the adaptive filter by weighting the delay coordinate vector and fixing weights between the input node and the reservoir at randomly determined initial values, the adaptive filter being further configured for comparing expected output data with the output data and updating one or more weights based on results of the comparing, the one or more weights being iteratively updated a predetermined number of times using a linear filter such that the output data becomes closer to the expected output data, wherein the learning is stopped when a difference in a value before the updating of the weights and after the updating of the weights is greater than or equal to a predetermined threshold value after the weights are iteratively updated the predetermined number of times.

2. The reservoir computing system according to claim 1, wherein a plurality of weights is set such that the reservoir computing system outputs the output data that is expected for the input data.

3. The reservoir computing system according to claim 2, further comprising:
a learning processing section operable to update the plurality of weights in a manner to reduce an error between output data output by the adaptive filter in response to the input node being supplied with training input data and expected output data that is expected for the training input data.

4. The reservoir computing system according to claim 3, wherein the learning processing section is operable to adjust at least one of the number of timings among the plurality of timings and an interval between the plurality of timings, in a manner to reduce the error.

5. The reservoir computing system according to claim 4, wherein the learning processing section is operable to adjust at least one of the number of timings among the plurality of timings and the interval between the plurality of timings, using cross-validation.

6. The reservoir computing system according to claim 3, wherein the reservoir includes a network having a plurality of nodes, and only a portion of the nodes among the plurality of nodes are connected to the output node.

7. The reservoir computing system according to claim 6, wherein only one node among the plurality of nodes of the reservoir is connected to the output node.

8. The reservoir computing system according to claim 6, further comprising:
a first output node that is connected to a first node among the plurality of nodes of the reservoir; and
a second output node that is connected to a second node among the plurality of nodes of the reservoir, wherein
the adaptive filter is operable to output the output data based on the plurality of output values received by the second output node in response to a path leading to the adaptive filter from the reservoir via the first output node failing,
wherein the adaptive filter outputs a sum of each of the one or more weights of the output data of the output nodes for use for the comparing.

9. The reservoir computing system according to claim 6, further comprising
two or more of the output nodes operable to connect respectively to two or more nodes among the plurality of nodes of the reservoir, wherein
the vector generation section is operable to automatically generate respective delay coordinate vectors based upon the output values of the two or more output nodes and a plurality of timings, and
the adaptive filter is operable to output the output data based on a result obtained by weighting each respective delay coordinate vector.

10. The reservoir computing system according to claim 6, wherein the weights among the plurality of nodes in the reservoir do not change as a result of learning.

11. The reservoir computing system according to claim 10, wherein the weights among the plurality of nodes in the reservoir are operable to be determined using random numbers.

12. The reservoir computing system according to claim 1, wherein the output node is operable to output, as the output value, a value expressing a spike interval of the output signal output by the reservoir.

13. The reservoir computing system according to claim 1, wherein the reservoir is a physical reservoir operable to output an electrical, magnetic, optical, mechanical, thermal, or acoustic output signal in response to an electrical, magnetic, optical, mechanical, thermal, or acoustic input signal.

14. The reservoir computing system according to claim 13, wherein the reservoir includes a ferromagnetic material or a phase change material.

15. A computer program product comprising a non-transitory computer readable storage medium having program instructions embodied therewith, the program instructions executable by a computer to cause the computer to: supply an input node of a reservoir with an input signal corresponding to input data, the reservoir comprising a plurality of nonlinear nodes, the nonlinear nodes being configured to issue a nonlinear response to the input signal; output, with the reservoir, an output signal in response to the input signal; output, with one or more output nodes, an output value corresponding to the output signal that is output by the reservoir, the reservoir being configured to restrict an increase in a number of connections to the output nodes and perform learning by increasing a number of dimensions and adjusting an interval T between a plurality of timings and prevent underfitting of the reservoir computing system; generate, automatically with a vector generation section operably connected to the output node, a delay coordinate vector based upon the output value of the output node and the plurality of timings; and output, with an adaptive filter operably connected to the vector generation section, data based on a result obtained by updating the adaptive filter by weighting the delay coordinate vector and fixing weights between the input node and the reservoir at randomly determined initial values, the adaptive filter being further configured for comparing expected output data with the output data and updating one or more weights based on results of the comparing, the one or more weights being iteratively updated a predetermined number of times using a linear filter such that the output data becomes closer to the expected output data, wherein learning is stopped when a difference in a value before the updating of the weights and after the updating of the weights is greater than or equal to a predetermined threshold value after the weights are iteratively updated the predetermined number of times.

16. The computer program product according to claim 15, wherein a plurality of weights is updated in a manner to reduce an error between output data output in response to the input node being supplied with training input data and expected output data that is expected for the training input data.

17. The computer program product according to claim 16, wherein at least one of the number of timings among the plurality of timings and an interval between the plurality of timings is adjusted in a manner to reduce the error.

18. The reservoir computing system according to claim 1, wherein dimensions d of the delay coordination vector are adjusted using the vector generation section based on an evaluation value of an error, the evaluation value of the error being the normalized root mean square error (NRMSE), which is determined by:

$$NRMSE = \sqrt{\frac{\langle (y-y')^2 \rangle}{\langle (y-\langle y \rangle)^2 \rangle}},$$

where y represents the expected output data, y' represents output data such that the evaluation value NRMSE indicates that the learning is effective when the value is less than one and indicates that an effect of the learning is higher when the value becomes closer to zero.

* * * * *